May 13, 1958      J. B. WIXSON      2,834,608
MOTOR VEHICLE UNDERCARRIAGE PROTECTIVE DEVICE

Filed July 25, 1956      3 Sheets-Sheet 1

INVENTOR.
JOHN B. WIXSON
BY James J. Cannon

ATTORNEY

May 13, 1958  J. B. WIXSON  2,834,608
MOTOR VEHICLE UNDERCARRIAGE PROTECTIVE DEVICE
Filed July 25, 1956  3 Sheets-Sheet 2
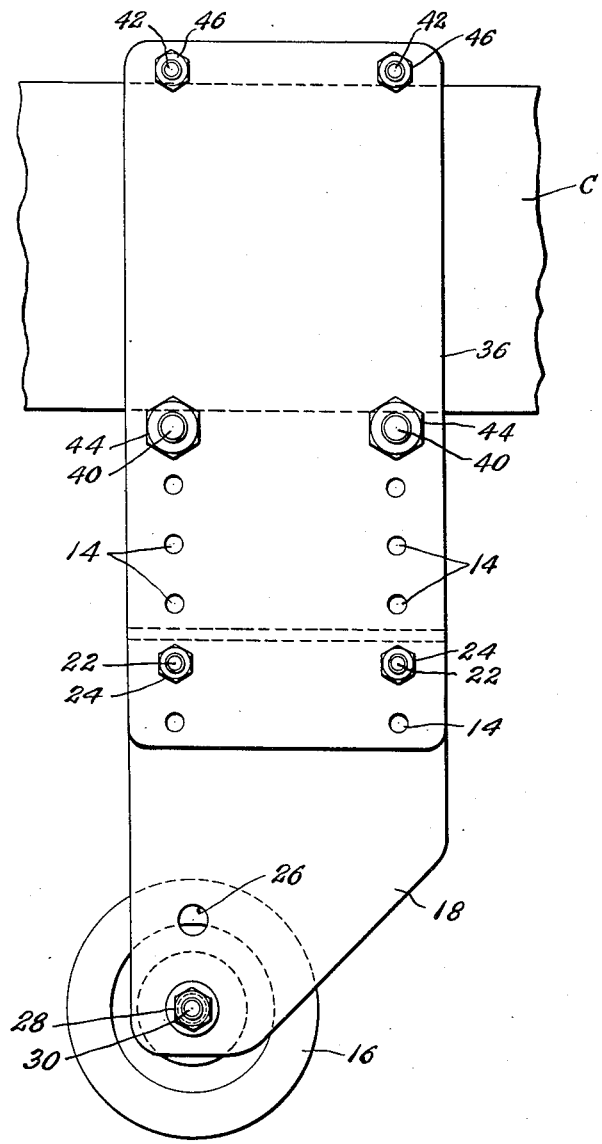
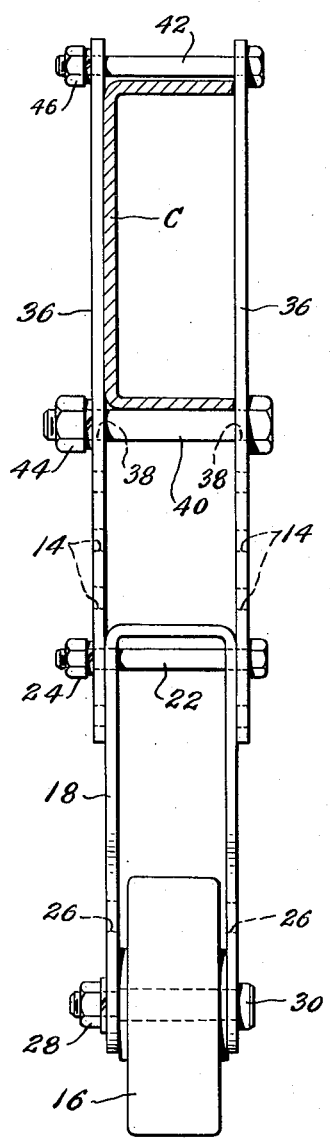
INVENTOR.
JOHN B. WIXSON
BY James J Cannon
ATTORNEY May 13, 1958  J. B. WIXSON  2,834,608
MOTOR VEHICLE UNDERCARRIAGE PROTECTIVE DEVICE
Filed July 25, 1956  3 Sheets-Sheet 3
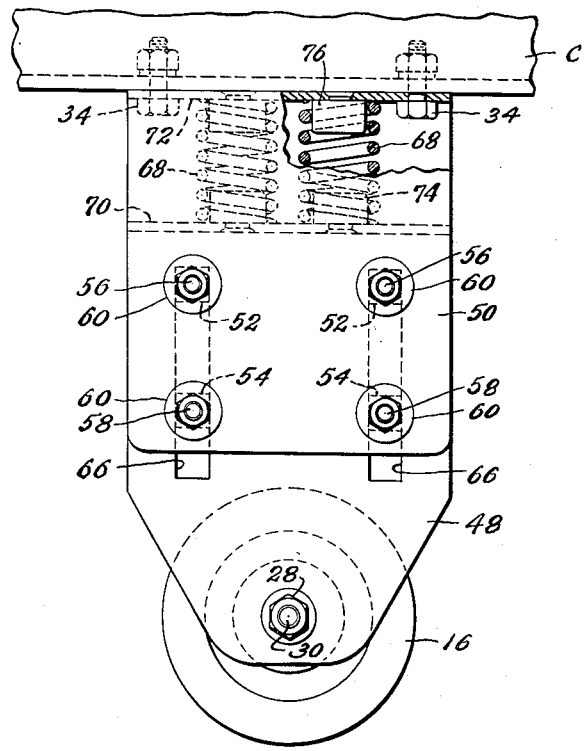
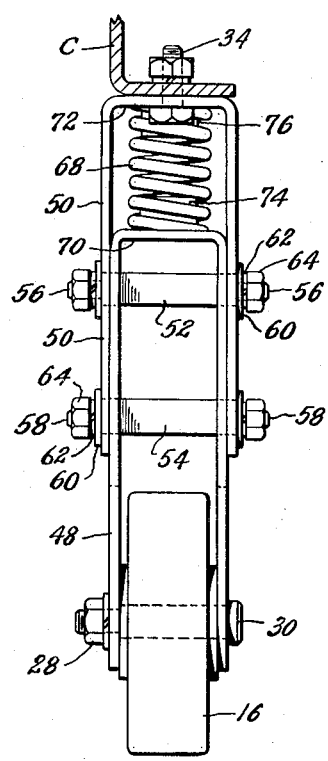
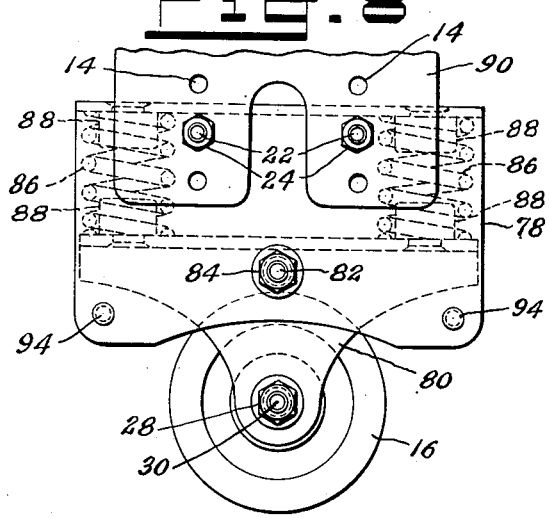
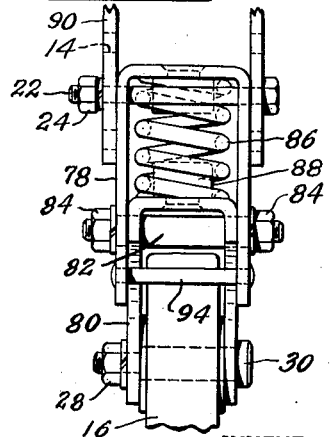
INVENTOR.
JOHN B. WIXSON
BY
James J. Cannon
ATTORNEY

United States Patent Office 2,834,608
Patented May 13, 1958

2,834,608

MOTOR VEHICLE UNDERCARRIAGE PROTECTIVE DEVICE

John B. Wixson, Lyndhurst, N. J.

Application July 25, 1956, Serial No. 600,105

3 Claims. (Cl. 280—150)

My invention relates to protective devices for the undercarriage of motor vehicles and is directed particularly to auxiliary roller devices adapted to be attached at one or more locations at the ends of the vehicle framework and operative to limit excessive downward motion of the front or rear ends of the vehicle so as to prevent damage to the undercarriage.

It is not uncommon in present day low-slung automobiles for the lower parts of the bumpers, undercarriage, crank-case, muffler, transmission housing, etc., to scrape along the ground when the automobile is driven over a deep depression or up or down a sharp grade, such as when entering or leaving home driveways, street intersections, etc.

It is accordingly the principal object of my invention to provide an auxiliary protective device operative to limit downward movement of the front and/or back end of the vehicle when driving over such depressions to prevent damage to the undercarriage and equipment nearest the ground.

A more particular object of my invention is to provide a protective device of the character described which comprises a support structure attachable to the vehicle framework, and a small wheel journalled in the support structure and adjustably positioned in the vertical direction with respect thereto as determined by the distance from the road surface to that part of the vehicle to be protected.

Another object of my invention is to provide a protective device of the character described in which the auxiliary wheel is resiliently mounted in the vertical direction with respect to the support structure, to minimize shock when the auxiliary wheel first comes into play upon riding over a road depression or the like.

Still another object is to provide a protective device of the above nature in which the auxiliary wheel is resiliently mounted not only in the vertical direction, but also in the direction of vehicle travel, whether going forward or backward.

Another object is to provide a protective device of the above nature which is inexpensive to manufacture, easy to apply and adjust, and simple, effective and long wearing in operation.

Other objects, features and advantages of my invention will be apparent from the following description when considered together with the accompanying drawings.

In the drawings, wherein like reference numerals denote corresponding parts throughout the several views:

Fig. 4 is a side view of a second form of protective device embodying the invention;

Fig. 5 is a front end view of the embodiment shown in Fig. 4;

Fig. 6 is a side view of a third form of protective device embodying the invention and incorporating vertically resilient mounting means for the auxiliary wheel;

Fig. 7 is a front end view of the embodiment shown in Fig. 6;

Fig. 8 is a side view, with portions broken away, of a fourth form of protective device embodying the invention and incorporating vertically and horizontally resilient mounting means for the auxiliary wheel.

Figure 9 is a front end view of the embodiment of Figure 8.

Figure 1:
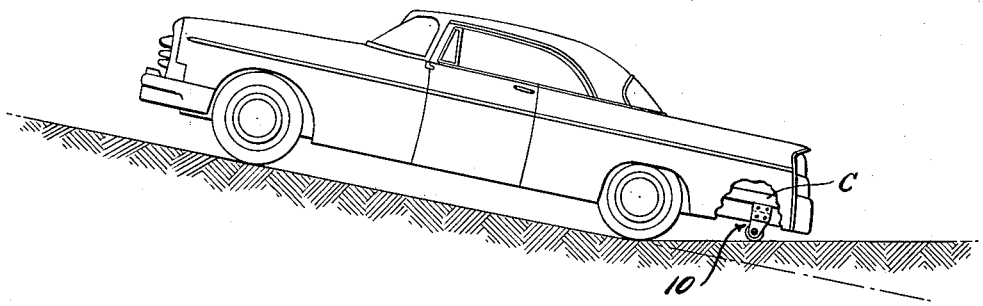
Fig. 1 is a side view of an automobile with a section of the rear fender broken away to show the improved protective device embodying the invention in operation.
Figure 2:
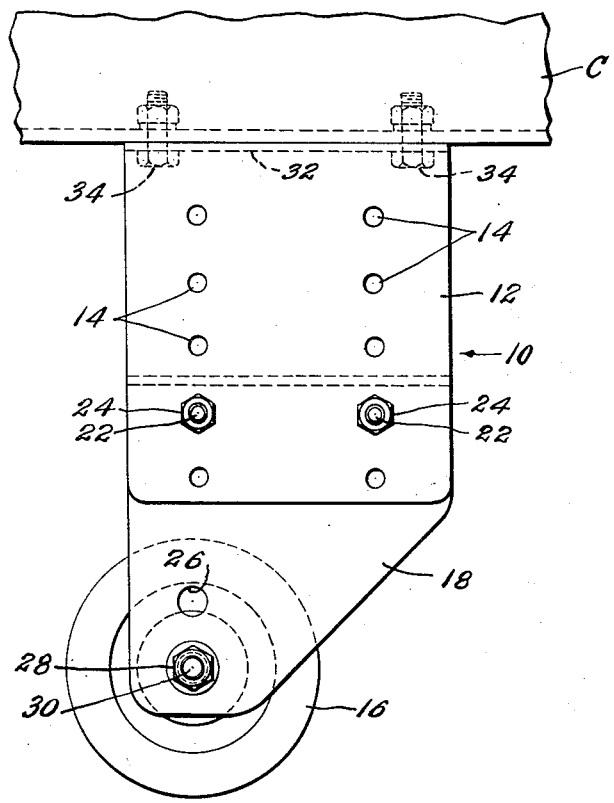
Fig. 2 is a side view of one form of protective device embodying the invention.
Figure 3:
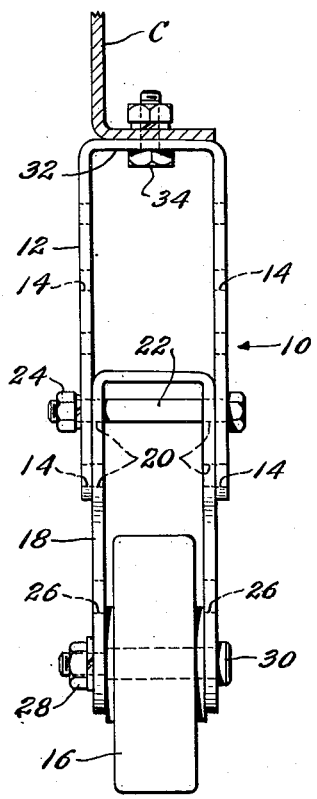
Fig. 3 is a front end view of the device shown in Fig. 1.

Referring to the drawings:

The numeral 10 in Figs. 1, 2 and 3 indicates generally the first embodiment of the improved undercarriage protective device for automotive vehicles, the same comprising a U-shaped support bracket 12, the sides of which are each provided with a plurality of pairs of horizontally aligned and vertically spaced openings 14. The device also comprises a small cylindrical wheel 16 journalled between the sides of a U-shaped wheel support member 18. The sides of the wheel support member 18 are provided with registering pairs of openings 20 spaced to be in horizontal alignment with the openings 14 in the support bracket 12. The side-to-side thickness of the wheel support member 18 is such as to be snugly embraced between the sides of the support bracket 12. The vertically arranged pairs of openings 14 in the support bracket 12 allow the wheel support member 18 to be adjustably positioned in the vertical direction within said support bracket and held therein by means of pairs of bolts 22 and nuts 24 extending through selected ones of the openings 14 and 20. Additional aligned wheel axle openings 26 are also provided in the wheel support member 18 to allow raising the wheel 16 for additional vertical adjustment, if needed. This can be effected simply by moving the wheel axle nut 28 and bolt 30 and journalling the wheel 16 at the higher position between the openings 26.

The web 32 between the sides of the support bracket 12 is drilled to receive a pair of bolts 34 for securing the protective device against the underside of a vehicle framework channel C, partially shown in Figs. 2 and 3, at the desired location.

The second embodiment of the invention illustrated in Figs. 4 and 5 differs from the above described embodiment of Figs. 2 and 3 only that instead of using a U-shaped support bracket 12, a pair of spaced plates 36 serve to adjustably interconnect the wheel support member 18 with the vehicle framework. To this end, the plates 36 are drilled as at 38 to receive lower cross-bolts 40 and upper cross-bolts 42, between which a car frame channel can fit as best illustrated in Fig. 5. After the protective device is positioned at the desired location along the vehicle framework channel C, the nuts 44, 46 are tightened on their respective bolts 40, 42 to secure the assembly in place. The bolts 40 preferably are of greater diameter than the bolts 42 to support the weight of the vehicle where the device comes into play. One advantage of the embodiment of the invention illustrated in Figs. 4 and 5 is that it is not necessary to drill holes in the car framework for mounting purposes. Another advantage is that the device can readily be shifted along the car framework into the desired position.

The third embodiment of the invention illustrated in Figs. 6 and 7 differs from the first form shown in Figs. 2 and 3 in that the wheel support member 48 is resiliently supported in the vertical direction in the support bracket 50. To this end, the support bracket 50 is fitted with two pairs of transverse guide members 52, 54 square in cross-section and having threaded end studs 56, 58. Washers 60, lock washers 62 and nuts 64 hold the guide members 52, 54 in place. The wheel support member 48 is provided at each side with a pair of vertical rectangular slots 66 entrained on the guide members 52, 54 for vertical motion with respect to the support bracket 50. A pair of compression springs 68 are constrained between the facing web surfaces 70, 72 of the wheel support member 48 and the support bracket 50. Lower and upper bosses 74, 76 are riveted or otherwise secured to the webs 70, 72 respectively, and disposed in the ends of the springs 68 to hold them in place. It will be apparent that when pressure is applied upwardly against the wheel 16, as occurs when it comes into play during driving over a deep depression in the road, the wheel support member will be able to ride upwardly for a short distance against the compressional force of the springs 68, which will absorb any sharp striking force of the ground against the auxiliary wheel 16.

The fourth embodiment of the invention illustrated in Figs. 8 and 9 differs from the first embodiment illustrated and described above in connection with Figs. 2 and 3 in that the wheel 16, instead of being journalled directly on the wheel support member 78, is resiliently supported with respect thereto. To this end, a U-shaped wheel carriage 80 is provided which is centrally mounted between the sides of the support member 78 on a central pivoted axle 82 having threaded studs at each end and held in place by end nuts 84. Fitted between the facing web portions of the support member 78 and the wheel carriage 80 are a pair of compression springs 86, said compression springs being held in place by end bosses 88 riveted, welded or otherwise secured to said webs. The support bracket 90 (partially shown) is provided at each side with a vertically extending recess 92 to allow passage of the nuts 84 when the wheel support member is adjusted upwardly in said support bracket as hereinabove described in connection with the embodiment illustrated in Figs. 1 and 2. The lower end corners of the sides of the support member 78 are preferably interjoined by means of riveted transverse rods 94 which serve as stops for limiting pivotal motion of the wheel carriage 80 about the axle 82. In operation, when the wheel 16 strikes the ground sharply while the vehicle is passing over a depression or the like, the wheel carriage 82 will be deflected sidewardly one way or another about the axle 82 against the compressional force of the opposing spring 86 to lessen shock when the protective device first comes into play.

Although only one or two of the devices herein described when properly fitted to the car framework offer protection to the undercarriage at at least one end of the car, the rear end for example, to protect the muffler and gas tank, it is preferable to use four, one located approximately in each corner of the car frame.

While I have described preferred embodiments of my invention, it is understood that this disclosure is for the purpose of illustration and that various omissions, or changes in arrangement of parts, as well as the substitution of equivalent elements for those herein shown and described, may be made without departing from the spirit and scope of the invention as set forth in the appended claims.

I claim:
1. In a protective device for the undercarriage of motor vehicles having a framework with downwardly-facing surface portions, the combination comprising a U-shaped bracket adapted to be attached in inverted position along the underside of a motor vehicle framework, a U-shaped wheel support member, said U-shaped bracket having a web portion in face-to-face abutting disposition with respect to the downwardly-facing surface portion of an automobile framework, means for connecting said wheel support member in inverted position at one of a plurality of vertical positions, selectively, between the sides of said U-shaped bracket, and a wheel journalled at the lower end of said wheel support member between the sides thereof and operative to ride along the road surface when the vehicle travels over a deep depression or the like to prevent damage to the underside of the vehicle.

2. The protective device according to claim 1, wherein said selective connecting means comprises a plurality of pairs of aligned openings in said bracket and in said wheel support member, and a pair of bolts extending through selected ones of said openings.

3. A protective device for the undercarriage of a motor vehicle having a framework with downwardly-facing surface portions, comprising a unitary bent plate U-shaped support bracket having a flat horizontal web portion and flat spaced parallel side portions, a plurality of openings in said web portion for attaching said support member in inverted position against the underside of the vehicle framework with said horizontal web portion in face-to-face abutting relationship with respect to said downwardly-facing portions of said framework, a unitary bent plate U-shaped wheel support member having parallel flat sides spaced to fit in face-to-face relation between the inside faces of the side portions of said support bracket, means including a plurality of openings in said side portions and said sides and a plurality of bolts for adjustably securing said wheel support member in inverted position within said support bracket when said support bracket is attached against the underside of the vehicle, and an auxiliary wheel journalled between the sides of said wheel support member at the lower ends thereof for rolling contact with the ground when the undercarriage drops to within a predetermined distance with respect to the ground as the vehicle moves.

References Cited in the file of this patent

UNITED STATES PATENTS

| | | |
|---|---|---|
| 810,722 | Cook | Jan. 23, 1906 |
| 1,342,500 | Finch | June 8, 1920 |
| 1,403,687 | Hillstrom | Jan. 17, 1922 |
| 2,563,372 | Risse | Aug. 7, 1951 |
| 2,608,430 | Robert | Aug. 26, 1952 |

FOREIGN PATENTS

| | | |
|---|---|---|
| 270,573 | Great Britain | May 12, 1927 |